(12) United States Patent
Chang et al.

(10) Patent No.: US 9,800,097 B2
(45) Date of Patent: Oct. 24, 2017

(54) MOTOR STATOR

(71) Applicants: Chiahung Chang, Taichung (TW); Peihui Wen, Taichung (TW)

(72) Inventors: Chiahung Chang, Taichung (TW); Peihui Wen, Taichung (TW)

( * ) Notice: Subject to any disclaimer, the term of this patent is extended or adjusted under 35 U.S.C. 154(b) by 278 days.

(21) Appl. No.: 14/653,624

(22) PCT Filed: Oct. 12, 2013

(86) PCT No.: PCT/CN2013/085104
§ 371 (c)(1),
(2) Date: Jun. 18, 2015

(87) PCT Pub. No.: WO2014/183372
PCT Pub. Date: Nov. 20, 2014

(65) Prior Publication Data
US 2016/0043598 A1    Feb. 11, 2016

(30) Foreign Application Priority Data

May 16, 2013  (CN) ...................... 2013 20 268978 U
Jun. 8, 2013   (CN) ...................... 2013 20 332718 U

(51) Int. Cl.
*H02K 1/14*    (2006.01)
*H02K 1/12*    (2006.01)

(52) U.S. Cl.
CPC ................ *H02K 1/12* (2013.01); *H02K 1/14* (2013.01)

(58) Field of Classification Search
CPC .................................... H02K 1/12; H02K 1/14

USPC ........................................................ 310/254.1
See application file for complete search history.

(56) References Cited

U.S. PATENT DOCUMENTS

| | | | |
|---|---|---|---|
| 6,356,001 B1* | 3/2002 | Nishiyama | H02K 1/148 180/65.1 |
| 8,294,326 B2* | 10/2012 | Chai | H02K 1/148 310/216.044 |
| 2001/0035692 A1* | 11/2001 | Ong | H02K 55/04 310/254.1 |

(Continued)

FOREIGN PATENT DOCUMENTS

| | | |
|---|---|---|
| CN | 101154837 | 4/2008 |
| CN | 202616892 U | 12/2012 |

(Continued)

*Primary Examiner* — Forrest M Phillips
(74) *Attorney, Agent, or Firm* — Ming Chow; Sinorica, LLC

(57) ABSTRACT

A motor stator structure includes multiple teeth and multiple arched bridge sections respectively connected between the tooth roots of the adjacent teeth. Each of the arched bridge sections has an arched section extending along two adjacent sides of a predetermined parallelogram. The motor stator structure further includes multiple enlarged sections a respectively positioned at the tooth roots of the teeth. Each of the arched bridge sections is positioned outside the range of the corresponding enlarged section. The motor stator structure is composed of multiple small stators stacked on each other. At least two punched splits are respectively positioned between the tooth roots of two adjacent teeth to separate the adjacent teeth. The space of two ends of the arched bridge section is enlarged to increase the pass space of magnetic field.

4 Claims, 10 Drawing Sheets

(56) References Cited

U.S. PATENT DOCUMENTS

| 2008/0042512 | A1* | 2/2008 | Otsuji ................ H02K 3/325 |
| | | | 310/216.113 |
| 2012/0074797 | A1 | 3/2012 | Petter et al. |
| 2014/0339947 | A1* | 11/2014 | Wen ................ H02K 15/022 |
| | | | 310/194 |

FOREIGN PATENT DOCUMENTS

| JP | 1989-160333 A | 6/1989 |
| JP | 1991-124245 A | 5/1991 |
| JP | 1991-173328 A | 7/1991 |
| JP | 1999-220841 A | 8/1999 |
| JP | 2003-164089 A | 6/2003 |
| JP | 2008-067527 A | 3/2008 |

* cited by examiner

MOTOR STATOR

BACKGROUND OF THE INVENTION

1. Field of the Invention

The present invention relates generally to an electrical apparatus, and more particularly to an improved motor stator structure.

2. Description of the Related Art

Please refer to FIGS. 1 to 3, which are plane views of a conventional motor stator. In the conventional motor stator, in order to lower magnetic loss and enhance the efficiency, the bottom of the stator slot 2 of the stator 1 is formed with an arched bridge section 3. However, the bridge abutments 4 at two ends of the arched bridge section 3 are quite narrow. Therefore, when current passes the windings wound around the stator 1, the current will pass through the arched bridge section 3 to cut the adjacent magnetic field. As a result, due to the limitation of the shape of the arched bridge section of the conventional motor stator, the magnetic field will be interfered with due to the narrow space of the bridge abutments 4 at two ends of the arched bridge section. This will affect the function of the conventional motor stator.

SUMMARY OF THE INVENTION

It is therefore a primary object of the present invention to provide an improved motor stator in which the space of two ends of the arched bridge section disposed on the bottom of the stator slot is enlarged to increase the pass space of the magnetic field and thus avoid interference. Also, the effect achieved by the arched bridge section that cuts the adjacent magnetic fields is maintained. In comparison with the conventional motor stator, the present invention has a best anti-interference effect.

To achieve the above and other objects, the motor stator structure of the present invention has two technical characteristics. One of the technical characteristics is to make the arched section of each arched bridge section extend along two adjacent sides of a parallelogram. The other of the technical characteristics is to position the arched bridge section outside the range of the enlarged section of the tooth root. Both can avoid interference with the magnetic field.

The motor stator structure of the present invention includes: multiple teeth, the teeth being uniformly annularly distributed and radially outward extending, each of the teeth having a tooth root, the tooth roots of two adjacent teeth being arranged at intervals; and multiple arched bridge sections. Each of the arched bridge sections is bridged between the tooth roots of two adjacent teeth. Each arched bridge section has an arched section. The arched section extends along two adjacent sides of a predetermined parallelogram.

In the above motor stator structure, the parallelogram is a rhombus.

In the above motor stator structure, the parallelogram is a square.

In the above motor stator structure, each arched bridge section has a notch. The notch is formed on one side of the arched section with its opening directed to a center of the motor state.

In the above motor stator structure, the opening of the notch has an inner diameter smaller than an inner diameter of a main portion of the notch.

Preferably, the teeth radially outward extend and are centered at a curvature center. Each of the teeth has a tooth root at one end near the curvature center. The tooth root is spaced from the curvature center. Correspondingly, each arched bridge section has a notch. The notch is formed on one side of the arched section with its opening directed to the curvature center.

The motor stator structure of the present invention includes: multiple teeth, the teeth being uniformly annularly distributed and radially outward extending, each of the teeth having a tooth root, the tooth roots of two adjacent teeth being arranged at intervals; multiple enlarged sections positioned at the tooth roots of the teeth; and multiple arched bridge sections. Each of the arched bridge sections is bridged between the tooth roots of two adjacent teeth. The arched bridge section is positioned between the tooth roots of two adjacent teeth and positioned outside a range of the corresponding enlarged section.

In the above motor stator structure, each arched bridge section has an arched section. The arched section extends along a predetermined shape.

In the above motor stator structure, the predetermined shape along which the arched section extends is a parallelogram, an ellipse or a polygon.

In the above motor stator structure, the arched section extends along two adjacent sides of a parallelogram. The parallelogram is a rhombus or a square.

In the above motor stator structure, the arched section extends along a waved shape.

In the above motor stator structure, each arched bridge section has a notch. The notch is formed on one side of the arched section with its opening directed to a center of the motor state.

Preferably, the teeth radially outward extend and are centered at a curvature center. Each of the teeth has a tooth root at one end near the curvature center. The tooth root is spaced from the curvature center. Correspondingly, each arched bridge section has a notch. The notch is formed on one side of the arched section with its opening directed to the curvature center.

The motor stator structure of the present invention includes multiple small stators, which are stacked on and connected with each other. Each of the small stators has multiple teeth. The teeth radially outward extend and are centered at a curvature center. Each of the teeth has a tooth root at one end near the curvature center. The tooth root is spaced from the curvature center. Multiple arched bridge sections and at least two punched splits are respectively positioned between the tooth roots of the adjacent teeth. Each arched bridge sections is connected between the adjacent teeth. Each punched split serves to separate the adjacent teeth from each other.

In the above motor stator structure, each arched bridge sections has an arched section. The arched section extends along two adjacent sides of a predetermined parallelogram.

In the above motor stator structure, each small stator includes multiple enlarged sections respectively positioned at the tooth roots of the teeth. Each arched bridge section is positioned outside a range of the corresponding enlarged section.

The present invention is advantageous in that the space of two ends of the arched bridge section disposed on the bottom of the stator slot is enlarged to increase the pass space of the magnetic field and thus avoid interference. Also, the effect achieved by the arched bridge section that cuts the adjacent magnetic fields is maintained. In comparison with the conventional motor stator, the present invention has a best anti-interference effect.

The present invention can be best understood through the following description and accompanying drawings, wherein:

DETAILED DESCRIPTION OF THE PREFERRED EMBODIMENTS

Figure 1:
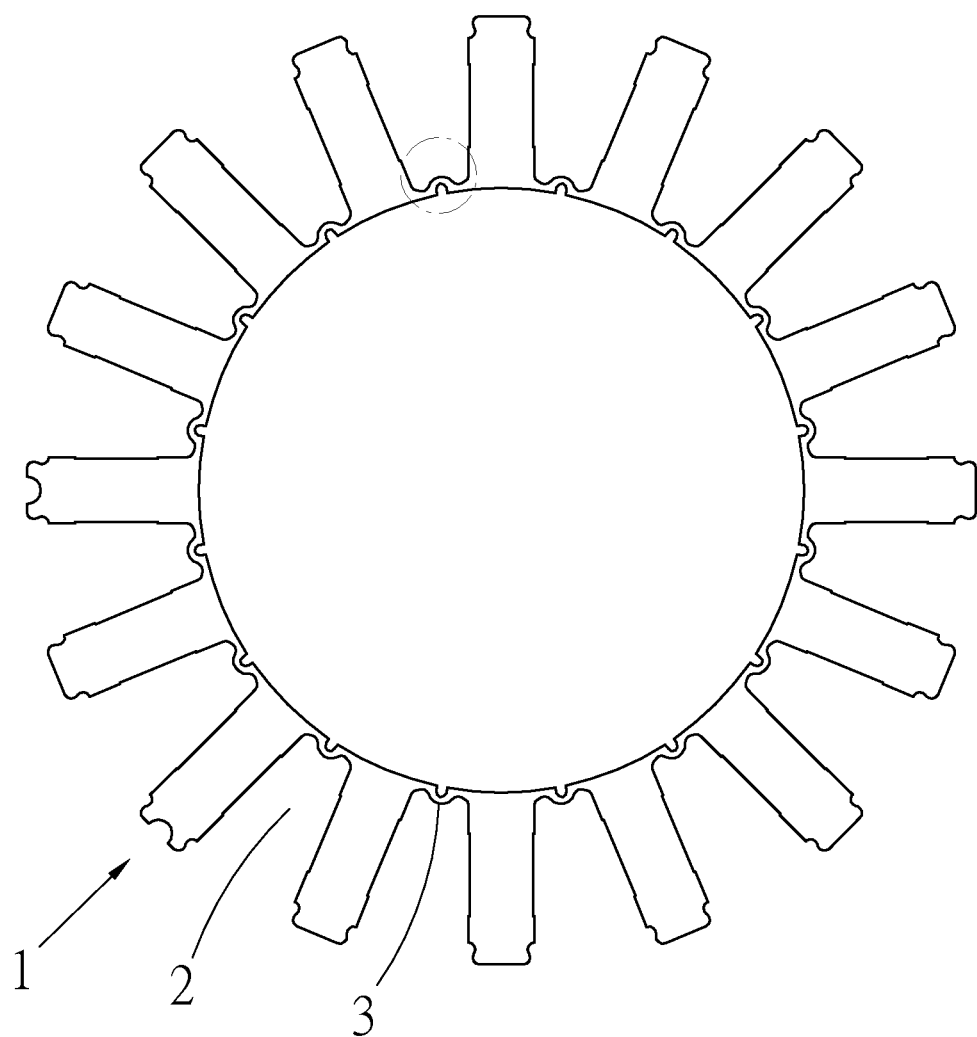
FIG. 1 is a plane view of a conventional motor stator.
Figure 2:
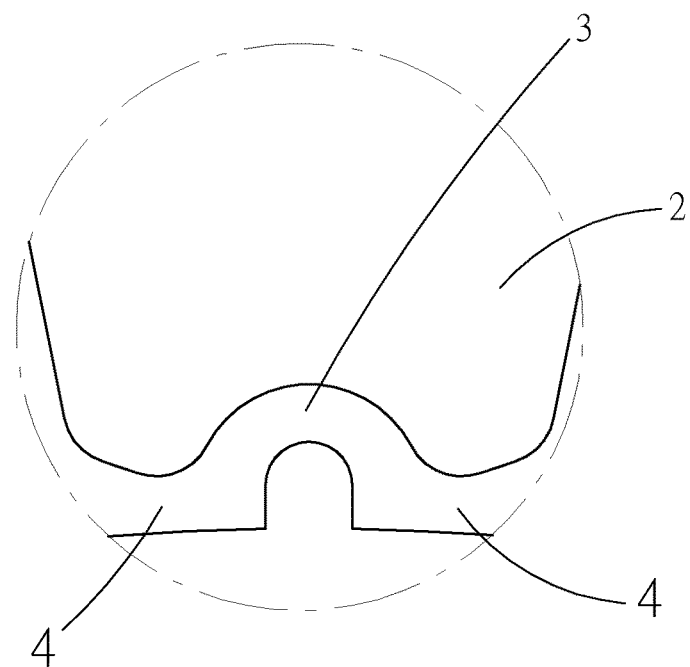
FIG. 2 is an enlarged view of circled area of FIG. 1.
Figure 3:
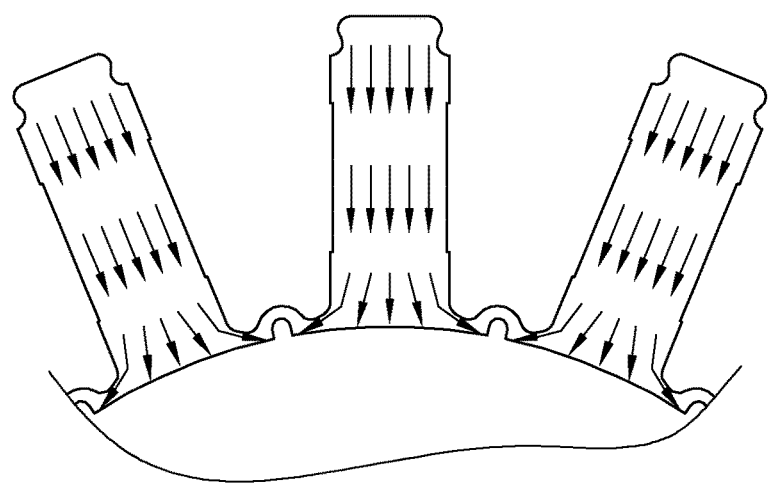
FIG. 3 is a plane view of a part of the conventional motor stator, showing the magnetic field thereof.
Figure 4:
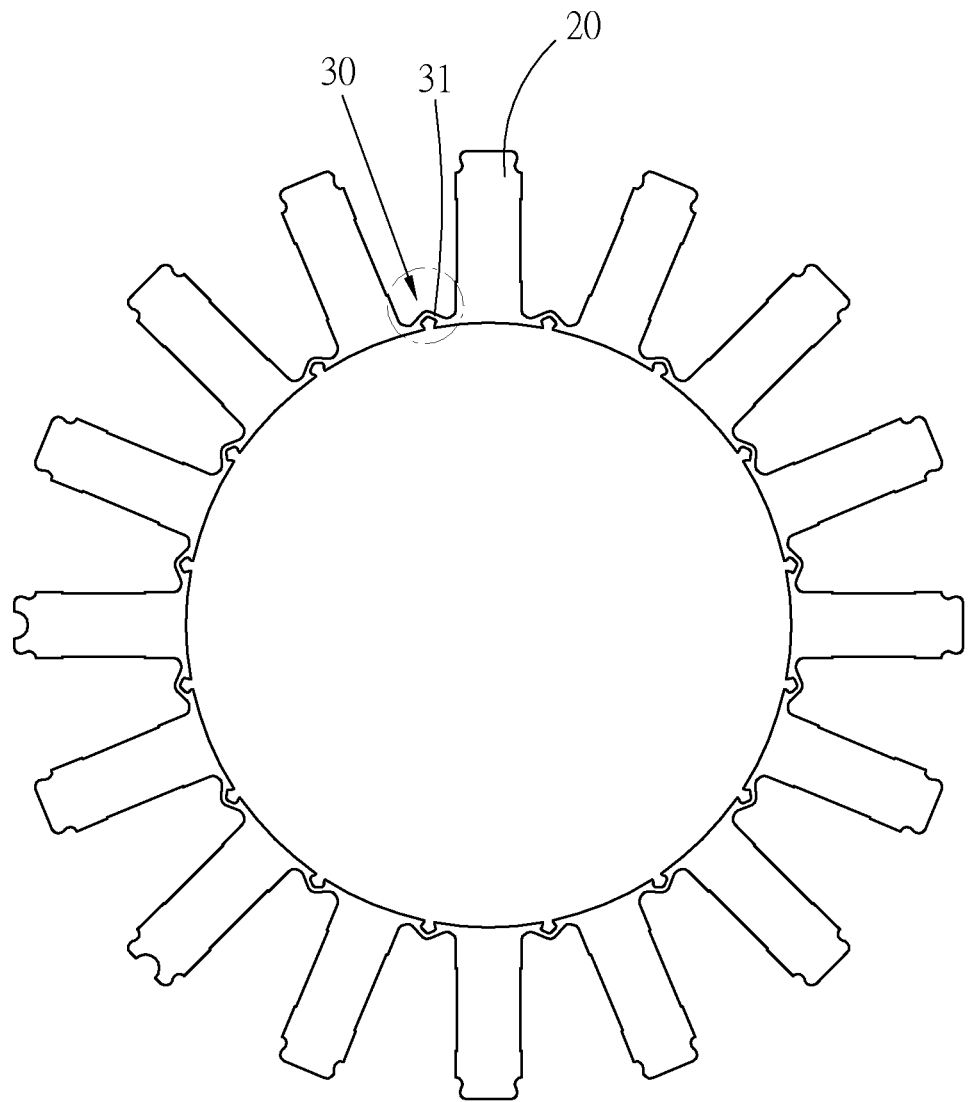
FIG. 4 is a plane view of a first embodiment of the present invention.
Figure 5:
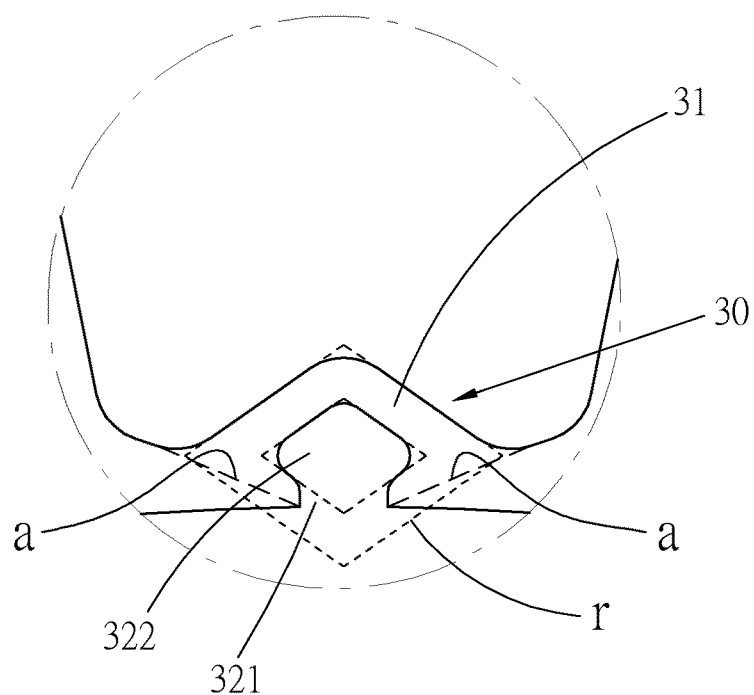
FIG. 5 is an enlarged view of circled area of FIG. 4.
Figure 6:
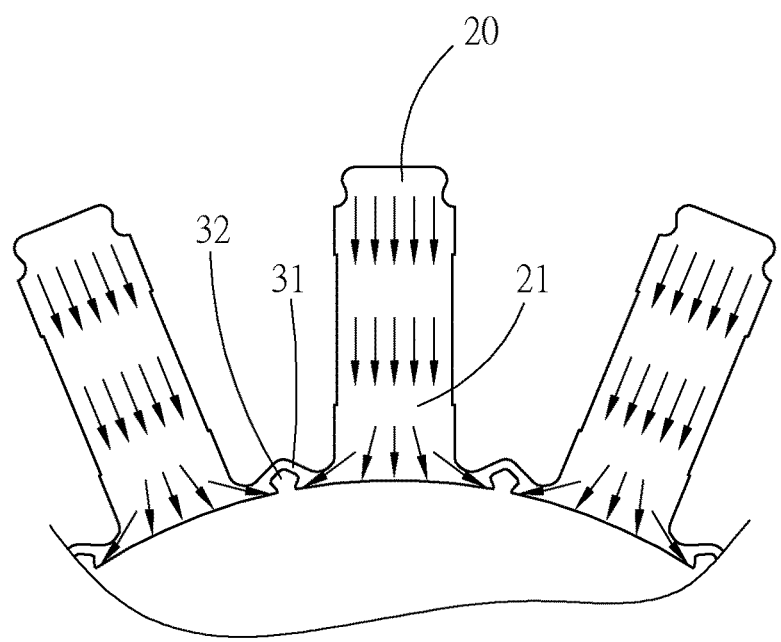
FIG. 6 is a plane view of a part of the first embodiment of the present invention, showing the magnetic field thereof.

Please refer to FIGS. 4 to 6. According to a first embodiment, the motor stator structure of the present invention is composed of multiple gasket-shaped small stators 10, which are stacked on each other. Each small stator 10 includes multiple substantially rectangular plate-shaped teeth 20. The teeth 20 radially outward extend and are arranged at equal angular intervals and centered at a curvature center of the small stator 10. The tooth roots 21 of the teeth 20 are positioned near the curvature center and spaced from the curvature center by a certain distance.

The small stator 10 further includes multiple arched bridge sections 30. Each of the arched bridge sections 30 has an arched section 31. The arched section 31 extends along two adjacent sides of a rhombus r. Two ends of the arched section 31 are bridged between the tooth roots 21 of two adjacent teeth 20. A notch 32 is formed on one side of the arched section 31 with its opening 321 directed to the curvature center. The opening 321 has an inner diameter smaller than an inner diameter of the main portion 322 of the notch 32.

As aforesaid, the arched section 31 of the arched bridge section 30 extends along two adjacent sides of a rhombus and is bridged between the tooth roots 21 of two adjacent teeth 20. Therefore, the arched bridge section 30 is positioned outside the range a of the enlarged section of the tooth root 21 so as to avoid interference with the magnetic field. The motor stator composed of the stacked small stators 10 can produce magnetic field within the range a of the enlarged section of the tooth root 21 without interference. In this case, the shortcoming of the conventional motor stator that the arched bridge section has a poor configuration to interfere with the magnetic field can be eliminated. Moreover, the magnetic field cutting function provided by the arched bridge section 30 can be maintained to lower magnetic loss and optimize the electrical efficiency.

Figure 7:
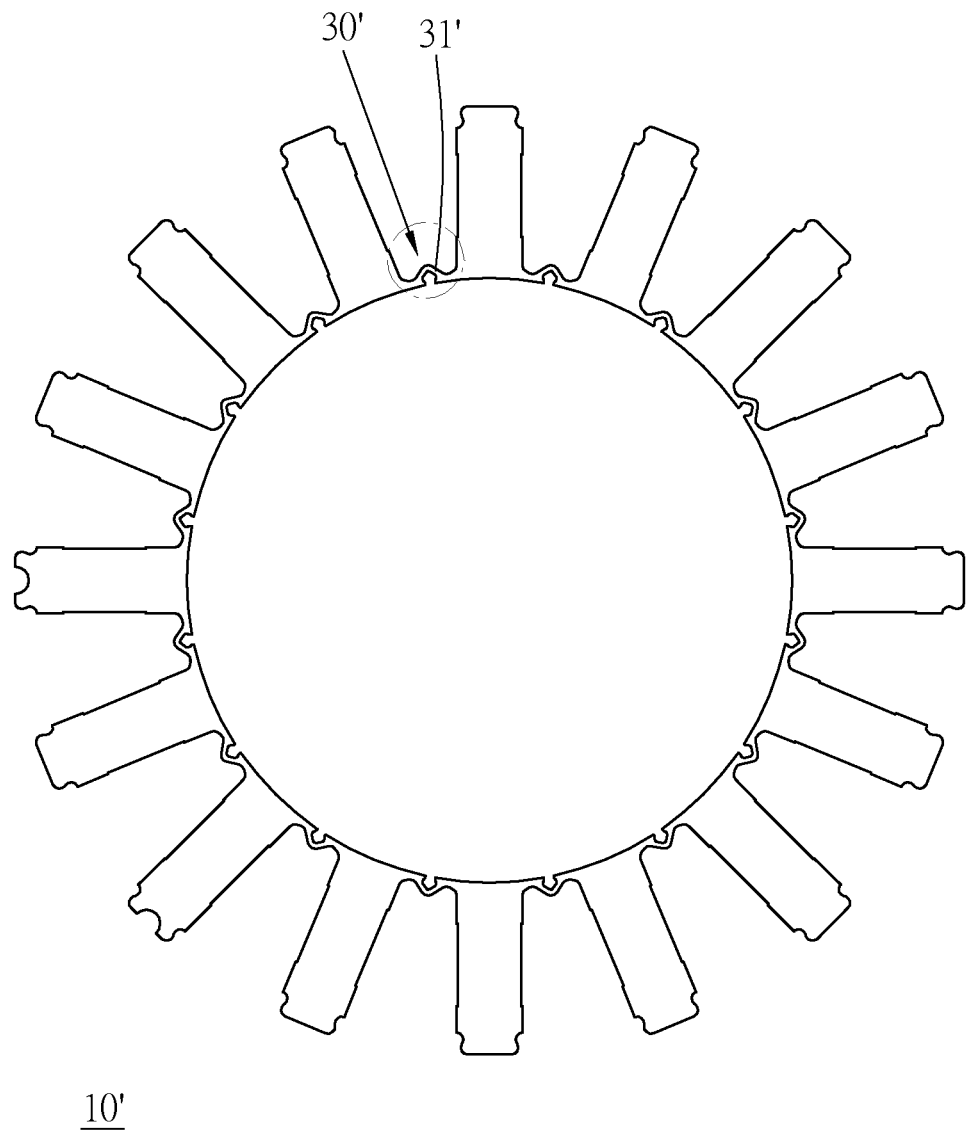
FIG. 7 is a plane view of a second embodiment of the present invention.
Figure 8:
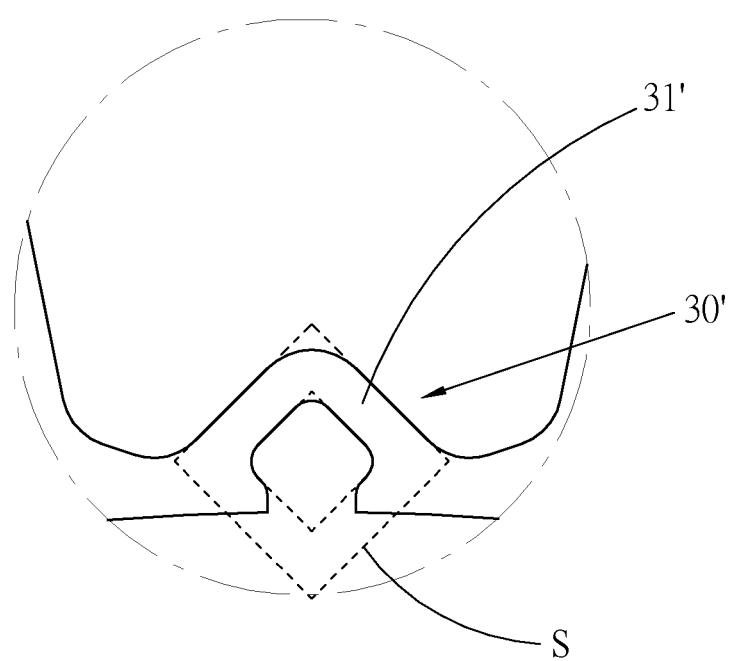
FIG. 8 is an enlarged view of circled area of FIG. 7.

Please now refer to FIGS. 7 and 8, which show a second embodiment of the motor stator structure of the present invention. The second embodiment is substantially identical to the first embodiment in technical characteristic. The second embodiment is only different from the first embodiment in that the arched section 31' of the motor stator 10' extends in a path slightly different from that of the first embodiment. The function provided by the second embodiment is identical to that of the first embodiment. To speak more specifically, the arched section 31' of the arched bridge section 30' extends along two adjacent sides of a square S.

Figure 9:
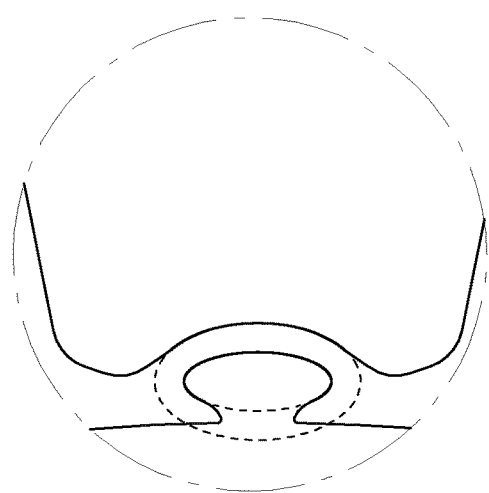
FIG. 9 shows several aspects of the shapes of the arched section of the arched bridge section of the present invention.
Figure 9:
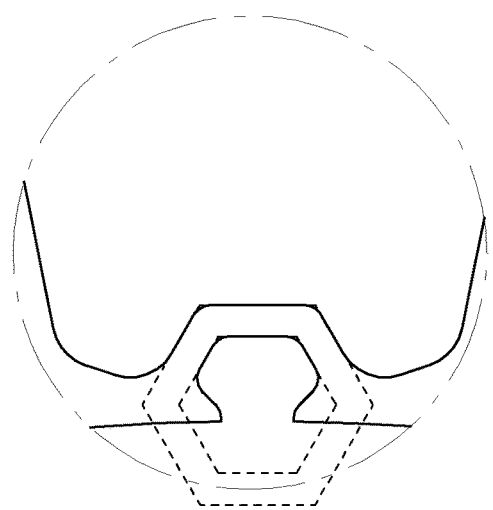
Figure 9:
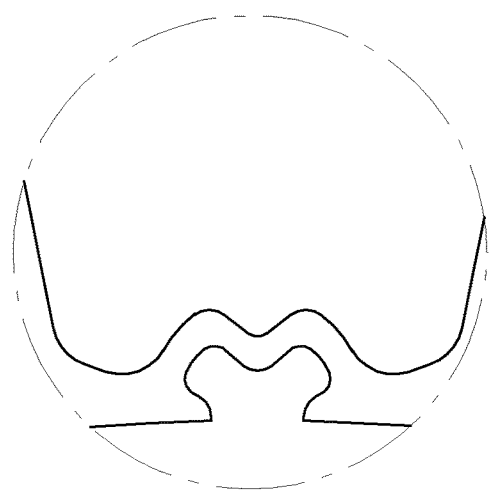

In addition, it should be noted that the present invention is characterized in that the arched section of the arched bridge section is positioned outside the range of the enlarged section of the tooth root so as to avoid interference with the magnetic field. Therefore, the scope of the present invention is not limited to the above embodiment in which the arched section extends along two adjacent sides of a parallelogram and any structure with this technical characteristic should fall within the protection range of the present invention. For example, as shown in FIG. 9, the arched section can extend along adjacent sides of any other geometrical shape such as extend along the adjacent sides of an ellipse or a pentagon, or extend along a non-geometrical shape such as a waved shape. All these shapes can satisfy the requirement that the arched section of the arched bridge section is positioned outside the range of the enlarged section of the tooth root so as to avoid interference with the magnetic field and should be included in the protection range of the present invention.

Figure 10:
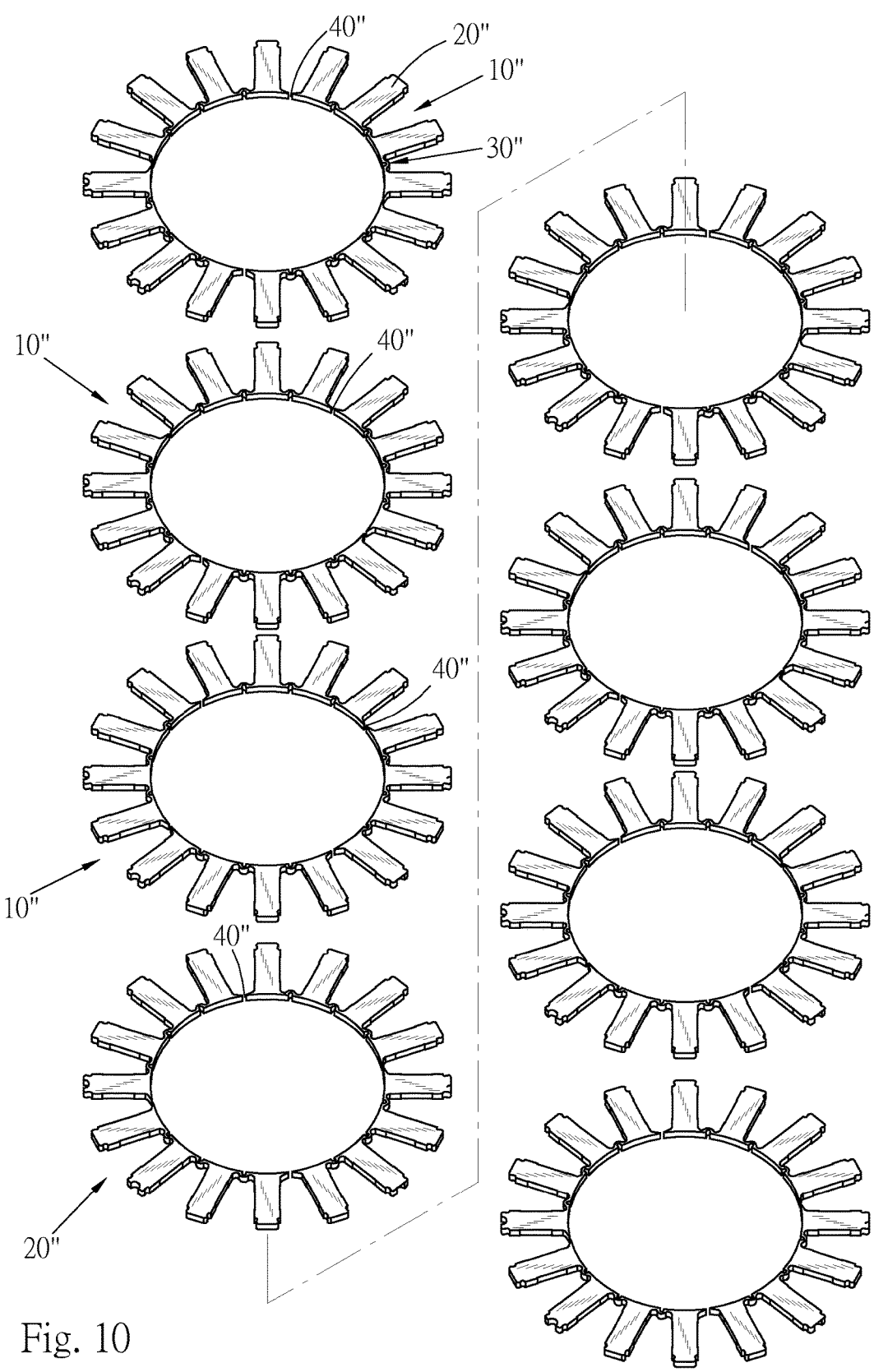
FIG. 10 is a perspective exploded view of the motor stator of the present invention.
Figure 11:
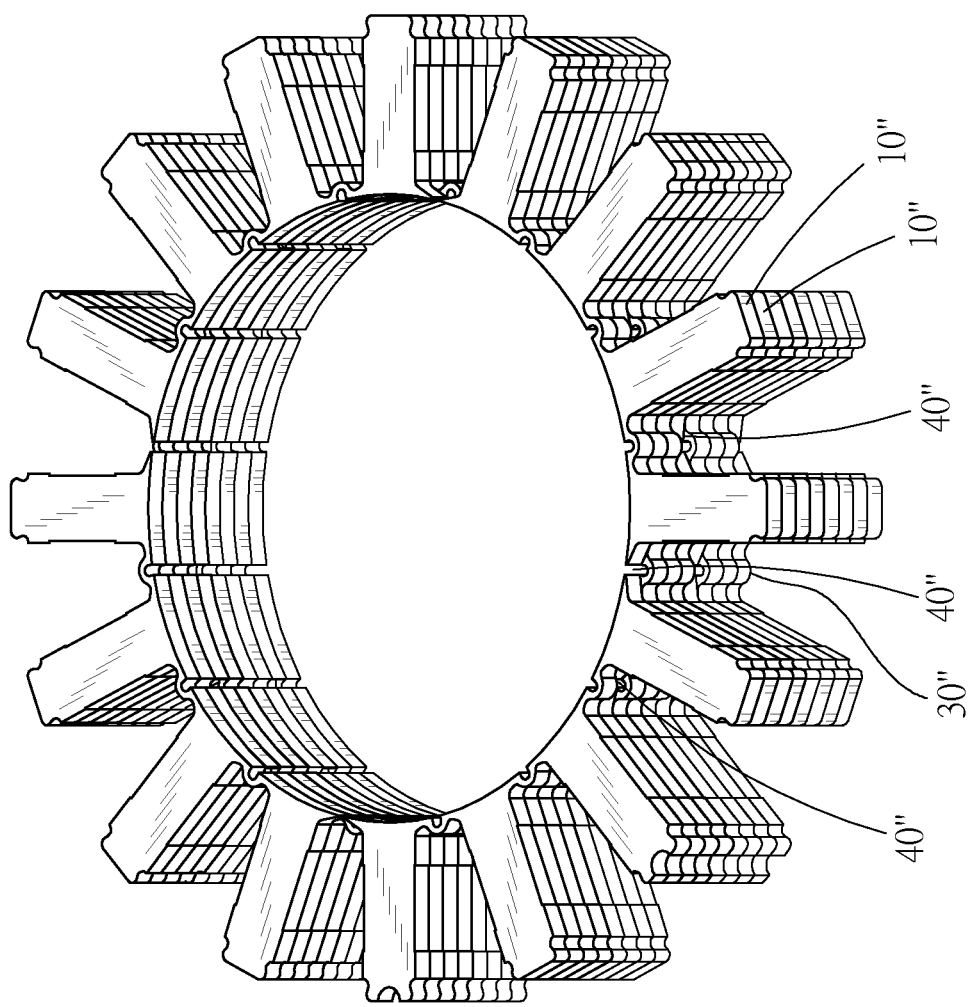
FIG. 11 is a perspective assembled view of the motor stator of the present invention.
Figure 12:
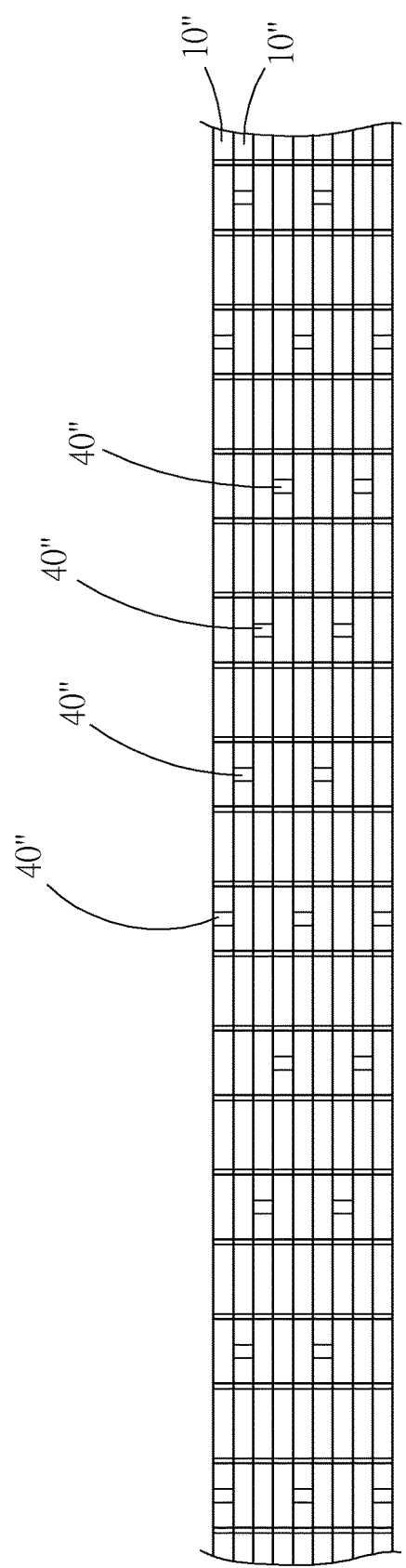
FIG. 12 is a side view of the motor stator of the present invention.

Furthermore, the above only describes the technical characteristic of one small stator. However, a motor stator is composed of multiple small stators, which are sequentially stacked on each other. Therefore, the practical technical content of the motor stator of the present invention in industrial application will be more detailedly described hereinafter with reference to FIGS. 10 to 12.

In other words, in a practical embodiment, the motor stator includes multiple small stators 10" identical to or equivalent to the technical contents of the above embodiments in structure. The small stators 10" can be more conveniently assembled and the motor stator has higher strength. Each small stator 10" has multiple teeth 20" and arched bridge sections 30" between the teeth 20" identical to those of the above embodiments. In addition, the small stator 10" further has four punched splits 40". The punched splits 40" are positioned between two adjacent teeth 20" instead of some of the original arched bridge sections 30". Accordingly, when the small stators 10" are stacked on and assembled with each other to form the motor stator, the punched splits 40" of the adjacent small stators are not aligned with each other. In this case, the motor stator can be more easily assembled and the strength of the assembled motor stator can be enhanced.

The above embodiments are only used to illustrate the present invention, not intended to limit the scope thereof. Many modifications of the above embodiments can be made without departing from the spirit of the present invention.

What is claimed is:

1. A motor stator structure comprising:
multiple teeth, the teeth being uniformly annularly distributed and radially outward extending, each of the teeth having a tooth root, the tooth roots of two adjacent teeth being arranged at intervals;
multiple arched bridge sections, each of the arched bridge sections being bridged between the tooth roots of two adjacent teeth;
each arched bridge section having an arched section, the arched section extending along a predetermined shape, the predetermined shape along which the arched section extends being a hexagon;

each arched bridge section having a notch, the notch being formed on one side of the arched section with its opening directed to a center of the motor state; and the opening of the notch having an inner diameter smaller than an inner diameter of a main portion of the notch.

2. A motor stator structure comprising:

multiple teeth, the teeth being uniformly annularly distributed and radially outward extending, each of the teeth having a tooth root, the tooth roots of two adjacent teeth being arranged at intervals;

multiple enlarged sections positioned at the tooth roots of the teeth;

multiple arched bridge sections, each of the arched bridge sections being bridged between the tooth roots of two adjacent teeth;

the arched bridge section being positioned between the tooth roots of two adjacent teeth and positioned outside a range of the corresponding enlarged section;

each arched bridge section having an arched section, the arched section extending along a predetermined shape, the predetermined shape along which the arched section extends being a hexagon;

each arched bridge section having a notch, the notch being formed on one side of the arched section with its opening directed to a center of the motor state; and the opening of the notch having an inner diameter smaller than an inner diameter of a main portion of the notch.

3. A motor stator structure comprising:

multiple small stators, which are stacked on and connected with each other;

each of the small stators having multiple teeth, the teeth radially outward extending and being centered at a curvature center, each of the teeth having a tooth root at one end near the curvature center, the tooth root being spaced from the curvature center, multiple arched bridge sections and at least two punched splits being respectively positioned between the tooth roots of the adjacent teeth, each arched bridge sections being connected between the adjacent teeth, each punched split completely separating the adjacent teeth from each other;

each arched bridge section having an arched section, the arched section extending along a predetermined shape, the predetermined shape along which the arched section extends being a hexagon;

each arched bridge section having a notch, the notch being formed on one side of the arched section with its opening directed to a center of the motor state; and the opening of the notch having an inner diameter smaller than an inner diameter of a main portion of the notch.

4. The motor stator structure as claimed in claim 3, wherein each small stator includes multiple enlarged sections respectively positioned at the tooth roots of the teeth, each arched bridge section being positioned outside a range of the corresponding enlarged section.

\* \* \* \* \*